N. C. ELFER.
LOG RAFTING SYSTEM.
APPLICATION FILED JULY 7, 1908.
935,476.
Patented Sept. 28, 1909.
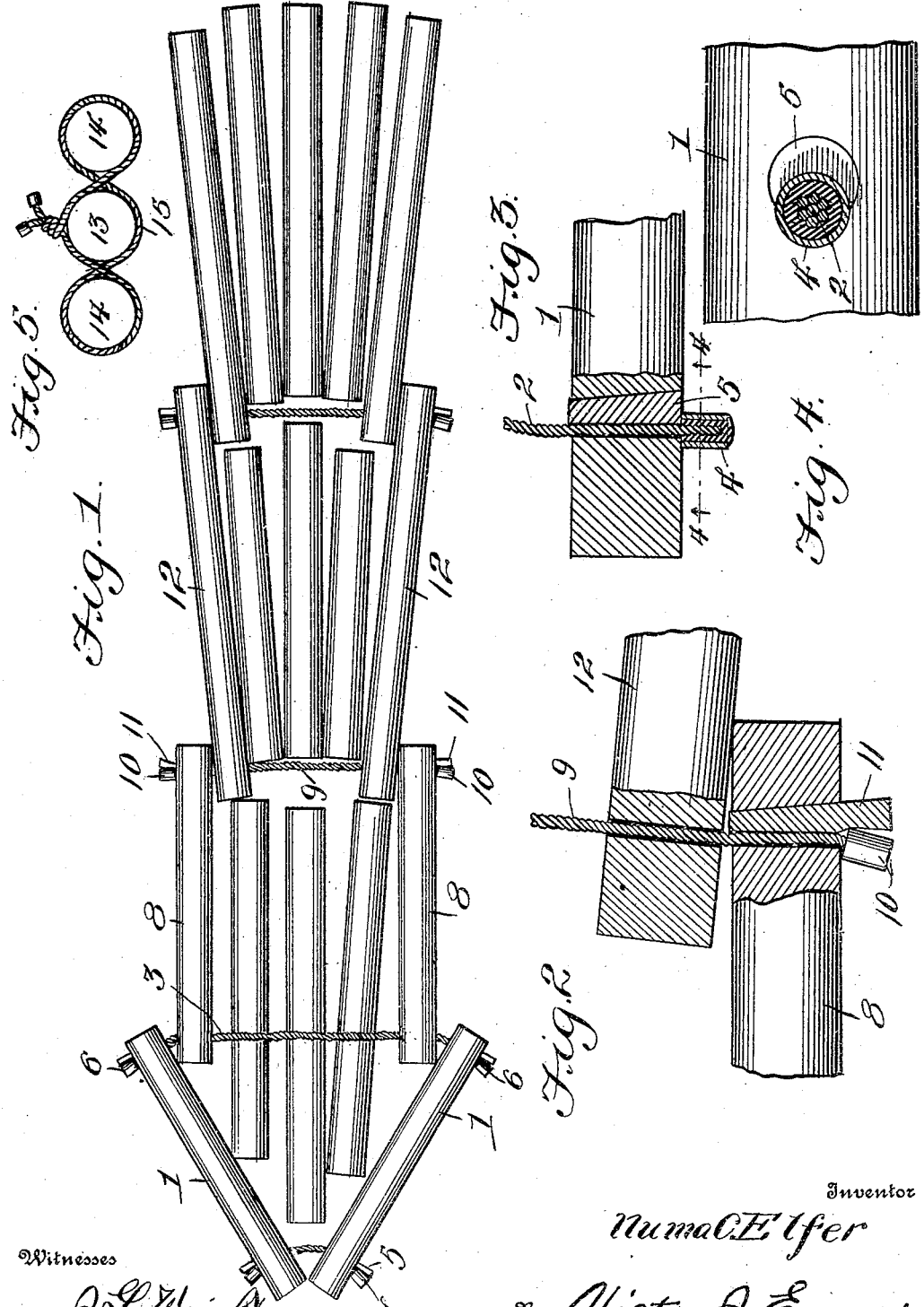

UNITED STATES PATENT OFFICE.

NUMA C. ELFER, OF ALLEMANDS, LOUISIANA.

LOG-RAFTING SYSTEM.

935,476.  Specification of Letters Patent.  Patented Sept. 28, 1909.

Application filed July 7, 1908. Serial No. 442,272.

*To all whom it may concern:*

Be it known that I, NUMA C. ELFER, a citizen of the United States, residing at Allemands, in the parish of St. Charles and State of Louisiana, have invented new and useful Improvements in Log-Rafting Systems, of which the following is a specification.

This invention relates to a log rafting system, and the object of the invention is to connect spaced logs together by detachable flexible securing members to provide a plurality of pockets or compartments adapted for the reception of a plurality of logs.

Another object of the invention is to provide the forward side booms of the raft in a V-shaped formation whereby the resistance to the current of the water will be effectively overcome.

A still further object of the invention is to provide side booms for the raft with flexible connections which may be easily and quickly applied to the booms, and which may be readily removed when required, the booms being spaced apart for the reception of a plurality of logs between each spaced pair of booms.

With these and other objects in view the invention resides in the novel construction of devices and their arrangement in operative combination, hereinafter fully described and claimed.

In the accompanying drawings, Figure 1 is a top plan view of a raft system constructed in accordance with the present invention. Fig. 2 is a sectional view illustrating the connection of the booms. Fig. 3 is a similar view illustrating a slightly modified form of securing the flexible connecting element with one of the booms. Fig. 4 is a longitudinal section upon the line 4—4 of Fig. 3, the parts being slightly enlarged to better illustrate the mode of connecting the collar with the flexible member. Fig. 5 is an end view showing how "sinkers" are suspended between "floaters" with the cables.

In the accompanying drawings, the numeral 1 designates the forward side booms of the log rafting system embodying the subject matter of the present application. These side booms 1 have their ends provided with alining openings adapted for the reception of retaining elements by which they are secured together. The retaining elements employed in the present construction embody flexible members 2 and 3. The element is provided with a suitable head or collar 4, upon each of its ends and is adapted to be inserted within the forward opening of the booms 1. The forward ends of the booms 1 are adapted to be positioned in close relation to each other, and a wedge 5 is employed for engagement within the openings provided within the forward ends of the booms to securely retain the flexible element 2 in desired position.

The rear ends of the side booms 1 are spread away from each other so as to provide a substantially V-shaped or outwardly positioned inclination to the booms 1 away from their connection with the flexible member 2. The flexible member 3 is also provided with suitable collars 6 which are adapted to be positioned within the openings provided upon this end of the booms 1 and to be retained therein in adjustable position by the wedges 7. The side booms 8, connected with the booms 1 are also provided with openings adapted for the reception of the flexible element 3, and their rear ends have similar openings adapted for the reception of a flexible cable 9, having collars 10, and secured within the openings by the wedges 11. These members 8 may have secured to their flexible cable 9 similar side booms 12, provided with suitable openings for the reception of the cable, and the side booms 12 may also have their outer ends provided with openings adapted for the reception of flexible connections and wedges for adjusting the position of the connections, and these members 12 may likewise be provided with similar side booms having openings adapted for engagement with their flexible connections. This system may be carried on indefinitely, and between the side booms 1, 8, 12 and etc., the spaces provided are adapted for the reception of logs.

By this construction and arrangement of parts, it will be seen that in a logging raft traveling in the direction of the arrow shown in Fig. 1, the side booms provide an efficient closure or compartment for the logs and effectively prevent the logs from being disconnected from the raft. It will be also noticed that by arranging the front booms 1 at an angle diverging from their foremost point of connection that the resistance to the water is effectively overcome and that by arranging booms behind the booms 1 within the space occupied by the front booms an efficient resistance to the current of the stream is secured, as the angular booms 1 deflect the water from the booms and logs immediately behind the front booms. The greatest advantage, however, of the angular position of the booms is that the raft of timber can rub against and glide by any object on the way, such as a piling, a tree, a stump, a barge etc.

In Fig. 5 of the drawings, I have illustrated the manner in which a non-floatable log, commonly termed a "sinker" is floated with the remainder of the logs. In this figure the numeral 13 designates the "sinker" and the numeral 14 designates the buoyant or "floater" logs. The sinker is positioned between the floaters and a cable 15, is wound around the "floaters" and the "sinkers" and securely tied. By this arrangement the "floaters" readily sustain the "sinker" upon the surface of the water, causing the same to float with the remainder of the raft.

Having thus fully described the invention what is claimed as new is:

1. In a device of the character described, a forward pair of booms having their front ends approximately engaging each other and their rear ends diverging away from each other, side booms flexibly connected with the spread ends of the front booms and with each other, and said flexible connecting member being adapted to engage and support logs between the booms.

2. In a device for the purpose set forth, a pair of forward booms provided with openings adjacent their ends, flexible members having heads upon each of their ends engaging the openings, wedge members adapted to be positioned within the walls formed by the openings and to bear against the flexible members to retain the ends of the booms in adjusted relation with each other, side booms also provided with openings adapted for the reception of one of the flexible connections, and logs interposed between the booms.

In testimony whereof I affix my signature in presence of two witnesses.

NUMA C. ELFER.

Witnesses:
  A. Francois,
  George Barch.